June 17, 1958  A. O. C. IVES  2,839,658
WATER HEATER
Filed Dec. 6, 1956
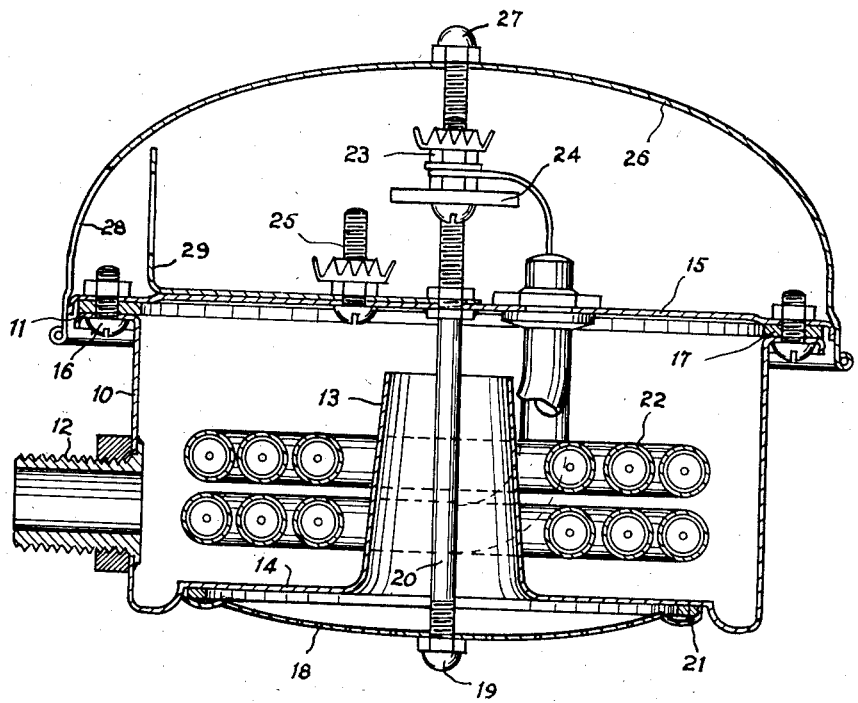
INVENTOR
ALFRED OLIVER CROMWELL IVES
By Linton and Linton
ATTORNEYS

United States Patent Office 2,839,658
Patented June 17, 1958

2,839,658

WATER HEATER

Alfred Oliver Cromwell Ives, Kensington, Western Australia, Australia, assignor to Values Pty. Limited, Perth, Western Australia, Australia, a corporation of Western Australia Application December 6, 1956, Serial No. 626,665

Claims priority, application Australia December 12, 1955

4 Claims. (Cl. 219—39)

This invention relates to an improved water heater which is particularly useful for heating water for showers.

It is an object of the present invention to provide a water heater of the instantaneous flow type which is relatively simple in construction and which operates without the benefit of any complex and expensive control valves or switchgear.

Broadly the invention resides in an electric water heater of the instantaneous flow type comprising a container closed at the top by means of a cover plate, a water inlet positioned close to the bottom of the container and adapted to be connected to a water supply through a manually operated control valve, a shower rose fitted into the bottom of the container so that the perforated portion projects therefrom and the inlet end of the rose is close to the top and in direct communication with the interior of the container so that when the control valve is opened the water flows freely through the water inlet, the container and the rose, and a sheathed electric heating element positioned within the container around the inlet end of the rose, the terminals of the element projecting through said cover plate and being connected to an electric power supply through a manually operated switch.

The invention will be better understood by reference to the following description of one embodiment suitable for use as a shower as shown in the accompanying drawing which is a sectional elevation of the heater.

As shown in the drawing a substantially cylindrical container 10 is provided with an outwardly directed flange 11. A threaded boss 12 is secured to the wall of the container near the bottom thereof so that the container can be connected to a water supply line (not shown) fitted with a control tap. If desired, the boss may be formed integral with the wall of the container. An outlet 13 is formed integral with the bottom 14 of the container, the inlet end of the outlet being positioned close to the top of the container. A cover plate 15 is secured to the top of the container by means of screws 16 with a gasket 17 positioned between the periphery of the plate 15 and the flange 11. A shower rose is formed by fitting a perforated metal plate 18 over the lower end of the outlet, the plate being held in place by a nut 19 screwed on to the lower end of a central spindle 20 passing through the outlet and secured to the cover plate. A sealing gasket 21 is positioned between the outer periphery of the plate 18 and the bottom of the container.

An electric heating coil 22 of the immersion heater type is suspended from the cover plate and is arranged so that it surrounds the outlet 13. The ends of the coil are connected to terminals 23 mounted on a plate of insulating material 24 secured to the spindle 20. An earth terminal 25 is secured to the cover plate 15. A domed cover 26 covers the terminals and is held in position by a nut 27 screwed on to the upper end of the spindle 20. The cover 26 is provided with a hole 28 through which the conduit carrying the electrical supply wires (not shown) passes, the end of the conduit being supported by a bracket 29.

The electrical supply wires are connected to the terminals 23 and 25 and the supply of electric current controlled by a suitable switch, which may be of the tumbler type for manual operation. When a tumbler type of switch is used, it may be arranged so that the switch cannot be operated until the water supply has been turned on or the water supply turned off until the switch has been moved to the off position.

Preferably the shower rose plate 18 is constructed of a flexible material so that if the water pressure exceeds a predetermined value, the plate moves slightly away from the bottom of the container to release the excess pressure.

The water heating unit of the present invention is simple in construction and operation and can be readily fitted into position with a minimum of expense. By arranging the water outlet above the inlet, adequate mixing of the water is ensured while the container always contains sufficient water to protect the element from burning out.

While the invention has been described with reference to one specific embodiment, it is not limited thereto. Various types of shower roses may be used. For example, the shower rose may be pivotally connected to the outlet from the container so that the direction of the shower can be changed as desired. Alternatively the outlet may be provided with a nipple or like means whereby a flexible hose may be connected thereto. The hose can be used for supplying hot water for washing glasses in hotels and may be connected to an inverted spray for this purpose.

I claim:

1. An electric water heater of the instantaneous flow type comprising a container closed at the top by means of a cover plate, a water inlet positioned close to the bottom of the container and adapted to be connected to a water supply through a manually operated control valve, a shower rose fitted into the bottom of the container so that the perforated portion projects therefrom and the inlet end of the rose is close to the top and in direct communication with the interior of the container so that when the control valve is opened the water flows freely through the water inlet, the container and the rose, and a sheathed electric heating element positioned within the container around the inlet end of the rose, the terminals of the element projecting through said cover plate and being connected to an electric power supply through a manually operated switch.

2. An electric water heater as claimed in claim 1 wherein the shower rose is pivotally mounted in the bottom of the container.

3. An electric water heater of the instantaneous flow type comprising a container closed at the top by a cover plate and having a water inlet adapted to be connected to a water supply through a manually operated control valve, an outlet formed integral with and projecting into the container so that it terminates near the top thereof, a perforated plate fitted over the bottom of the outlet to form a shower rose and a sheathed electric heating element positioned within said container around said outlet, the terminals of the element projecting through said cover plate and being connected to an electric power supply through a manually operated switch.

4. An electric water heater as claimed in claim 3 wherein the perforated plate is formed of a flexible material so that it moves slightly away from the bottom of the container to release excess water pressure in the container.

References Cited in the file of this patent

UNITED STATES PATENTS

| | | |
|---|---|---|
| 1,908,114 | Cante | May 9, 1933 |
| 2,044,634 | Rieder | June 16, 1936 |
| 2,694,768 | Stiebel | Nov. 16, 1954 |
| 2,720,581 | Lorenzetti | Oct. 11, 1955 |